United States Patent [19]

deQuay

[11] Patent Number: 4,921,212
[45] Date of Patent: May 1, 1990

[54] HYBRID BUTTERFLY VALVE

[75] Inventor: Laurence deQuay, Slidell, La.

[73] Assignee: The United States of America as represented by the United States National Aeronautics and Space Administration, Washington, D.C.

[21] Appl. No.: 404,292

[22] Filed: Sep. 7, 1989

[51] Int. Cl.$^5$ ............................................. F16K 1/22
[52] U.S. Cl. ................................... 251/163; 251/160
[58] Field of Search ............... 251/160, 162, 163, 305, 251/308

[56] References Cited

U.S. PATENT DOCUMENTS

| | | | |
|---|---|---|---|
| 3,033,513 | 5/1962 | Valliez | 251/163 |
| 3,780,983 | 12/1973 | Topham et al. | 251/163 X |
| 4,482,128 | 11/1984 | Boechman et al. | 251/163 |

FOREIGN PATENT DOCUMENTS 1076456 2/1960 Fed. Rep. of Germany ...... 251/162

Primary Examiner—John C. Fox
Attorney, Agent, or Firm—William J. Sheehan; John R. Manning; Jerry L. Seemann

[57] ABSTRACT

A hybrid butterfly valve has a stationary seat and a valve closure disk which may rotate together with an actuating shaft from the fully open position to a position wherein the disk is aligned with the seat, and thereafter may be moved linearly into sealing relationship with the seat. The disk is supported by brackets having an elongated slot through which the shaft extends, the brackets being adapted to move linearly relative to the shaft. Cams fastened to the shaft initiate a 90° rotation of the disk from the fully open position to the position where the valve disk is aligned with the seat, and the cams act thereafter in conjunction with followers carried by the disk to move the disk and the brackets linearly. The disk carries guide members which are positioned in a guide slot, the guide slot having an arcuate portion and a linear portion, and the disk is guided by the guide members guided in the arcuate portion when the disk is fully opened to and until the disk is aligned with the seat, and thereafter the guide members are guided by the linear portion of the slot. A portion of each cam is spring biased so that the cams tightly engage follower rollers carried by the brackets during the rotational portion of the movement of the disk.

12 Claims, 2 Drawing Sheets

HYBRID BUTTERFLY VALVE

ORIGIN OF THE INVENTION

The invention described herein was made by an employee of the United States Government and may be manufactured and used by or for the Government for Government purposes without the payment of any royalties thereon or therefor.

BACKGROUND OF THE INVENTION

This invention relates to valves and more particularly to a hybrid butterfly valve having a rotatable and slidable closure disk providing the full flow advantages of a butterfly valve and the throttling and sealing advantages of globe and needle valves.

The high flow rate and relatively low pressure drop at full flow are some of the advantages that butterfly valves have over other valves. Other advantages include simplicity of operation, compact valve body and relatively low cost. However, balanced against these advantages butterfly valves have high valve seat wear and inability to maintain a tight seal. Additionally, if the valve is used to throttle the fluid flow or to frequently cycle to open and closed positions, these disadvantages are amplified and additionally frequent repair is required. Globe and needle valves, on the other hand, have good sealing and throttling capability because the valve disk or plug position can be closely regulated. Furthermore, because of the linear movement of the valve disk and its ability to be closely positioned within the valve seat, good sealing can be obtained.

The following art was reported as being the most pertinent located in a search conducted prior to the filing of the present application, and except for Bliss U.S. Pat. No. 1,669,119, and Topham et al., U.S. Pat. No. 3,780,983; this art is substantially deficient in regard to the present invention and is cited merely in fulfilment of applicant's duty of disclosure: U.S. Pat. Nos. 1,669,119 (Bliss); 1,722,752 (Karnath); 3,300,177 (Topham et al); 3,583,699 (Campbell); 4,206,903 (Scaramucci); and 4,693,451 (Tricini). Additionally, Italian Patent No. 503263 issued Dec. 4, 1954 was cited.

In Bliss, U.S. Pat. No. 1,669,119, and Topham et al., U.S. Pat. No. 3,780,983, a valve includes a cam for pressing the valve disk into the valve seat, and in Topham et al for unseating the valve seat, but these systems require springs to hold the disk to the rotating shaft during rotary motion of the disk. These springs also oppose the torque of the valve actuator when seating of the disk occurs both directly and through increased friction forces between the cam and the disk. Additional deficiences of such springs are readily apparent, especially in cryogenic environments where thermally induced stresses, variations of metallic elasticity properties due to thermal excursions, and thermally accelerated fatigue occurs, and in which substantially no leakage is tolerable. An additional concern of the prior art is the method and structure for guiding the disk motion to ensure that rotary and linear motion of the disk occur at separate times and in the correct sequence. Any significant frictional forces occuring between sliding members may result in unbalanced or improper seating of the disk into the valve seat when combined with thermal expansions and contractions in cryogenic applications.

SUMMARY OF THE INVENTION

Consequently, it is a primary object of the present invention to provide a hybrid butterfly valve having the full flow advantages of conventional butterfly valves and the throttling and sealing advantages of globe and needle valves.

It is another object of the present invention to provide a valve having a valve closing disk to which the motions of both conventional butterfly valves and globe and needle valves are applied, the disk being rotated as in butterfly valves and translated linearly as in globe and needle valves.

It is a further object of the present invention to provide a butterfly type valve having a valve disk rotatably driven by cams fast on a drive shaft, the disk being supported such that it may be moved linearly into tight sealing relationship with a valve seat after it has been rotatably positioned in alignment with the seat.

Accordingly, the present invention provides a hybrid butterfly type valve having the high flow rate low pressure drop advantages of a butterfly valve when in the full open position, and the tight sealing good throttling advantages of globe and needle valves. Thus, the valve incorporates the motions of both the conventional butterfly valve and of the globe and needle valves.

The invention contemplates a butterfly type valve having a stationary seat and a valve disk which may rotate with a shaft having an axis transverse to the fluid flow path through the valve body. The disk is supported by support brackets disposed loosely about the shaft, the brackets having a respective elongated shaft receiving slot. Cams are fastened to the shaft and initiate a 90° rotation of the disk from full open to a position wherein the disk is aligned with the valve seat, and a lateral movement to forcibly plug the disk into tight sealing relationship with the seat. Means comprising a stop and guide member carried by the disk acting within a guide slot in the valve body ensures that the rotary and longitudinal motions of the disk occur at separate times and in the correct sequence. The stop and guide members and guide slot are also constructed to enable uniform loading of the valve seat and thus reduces or eliminates valve seat wear optimally. Additionally cam followers in the form of rollers carried by the disk and the support brackets aid in reducing frictional forces resisting valve actuator torque and in guiding the movement of the disk such that the disk seats uniformly around the seat circumference and with maximum sealing force.

The invention can be used in conjunction with all types of fluid transfer control systems, and may be utilized for cryogenic systems and gas systems in which pressures and temperatures vary over wide ranges. Potential applications aboard space craft on long duration missions and operations are envisioned for the valve of the present invention.

BRIEF DESCRIPTION OF THE DRAWINGS

The particular features and advantages of the invention as well as other objects will become apparent from the following description taken in connection with the accompanying drawings, in which.

DESCRIPTION OF THE PREFERRED EMBODIMENT

Figure 1:
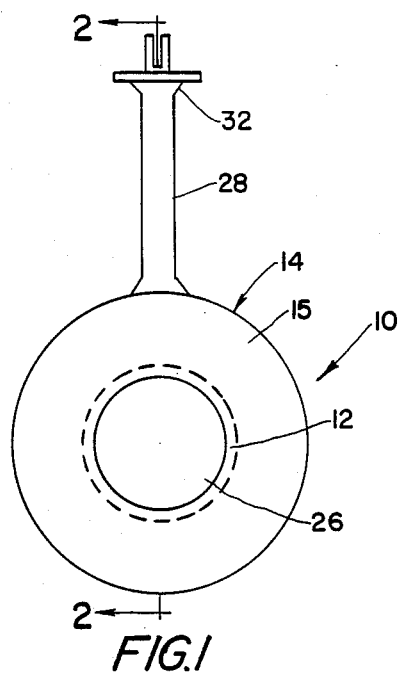
FIG. 1 is a front elevational view of a valve incorporating features constructed in accordance with the principles of the present invention.
Figure 2:
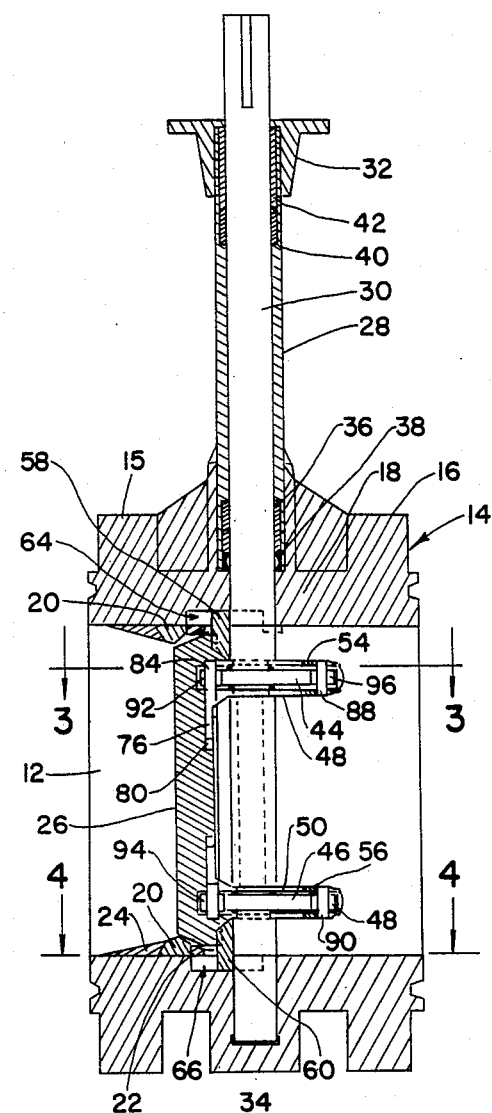
FIG. 2 is a longitudinal cross sectional view taken through the valve illustrated in FIG. 1, the valve being turned substantially 90° relative to that illustrated in FIG. 1.

Referring now to the drawings there is illustrated a valve 10 constructed in accordance with the present invention, the valve having a central bore 12 in a body 14 that may be connected to piping or the like at the front and rear by means of front and rear flanges 15, 16 respectively which may be welded to or formed integral with a conduit portion 18 to form the valve body 14. Disposed within the bore 12 in the conduit portion of the valve body 14 is an annular seat 20, the seat being securely held in position by means of inner and outer seat retainers 22, 24. The seat has an inclined surface 25 against which the face of a valve disk 26 may tightly seal as hereinafter described.

Mounted in the valve body and extending upwardly through an extension bonnet 28 is a shaft 30, the upper end of which may be connected to a conventional actuator (not illustrated), the body of which may be attached to a mounting bracket 32 secured to the extension bonnet 28 by conventional means such as welding and bolting or the like. The end of the shaft 30 remote from the actuator is received within a bushing 34 in the valve body remote from the bonnet 28 for rotation within the bonnet. Primary packing 36, and a K-wedge seal 38 tightly disposed in the bonnet prevent fluid from leaking up the bonnet, while secondary packing 40 and a packing retainer tube 42 secured to the bonnet prevents vapor leakage into the actuator. The bonnet 28 acts to thermally isolate the actuator from the valve body and the disk 26.

Figure 6:
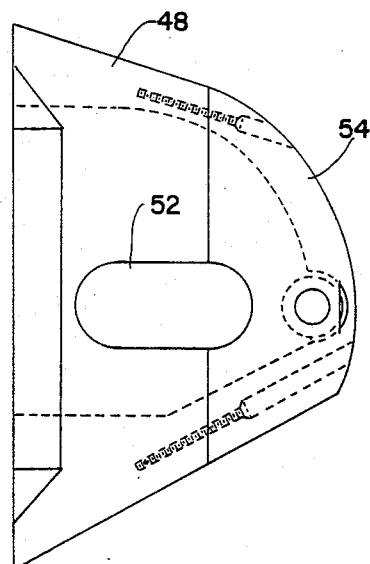
FIG. 6 is a plan view of one of the disk support brackets.
Figure 7:
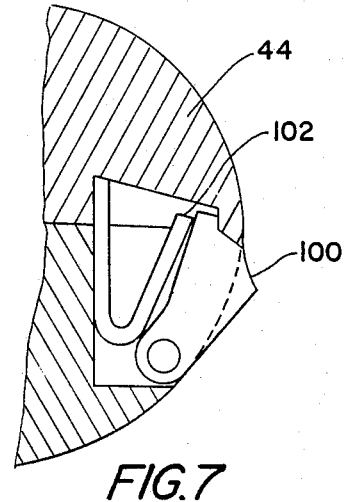
FIG. 7 is an enlarged fragmentary view of a portion of the structure illustrated in FIG. 3.

Fastened at spaced locations to the shaft 30 are first and second cams 44, 46 which preferably are enclosed within respective disk support brackets 48, 50, each disk bracket comprising a bifurcated member for receiving the respective cam and having an elongated slot 52, having linear edges extending from arcuate ends, as illustrated in FIG. 6, for receiving the shaft 30 so that the bracket is movable relative to the shaft along the axis of elongation of the slot 52, said axis being parallel to the axis of the bore 12. A respective cap 54, 56 is bolted to the respective disk support bracket 48, 50 after the brackets 48, 50 are disposed about the shaft 30 during assembly.

Figure 4:
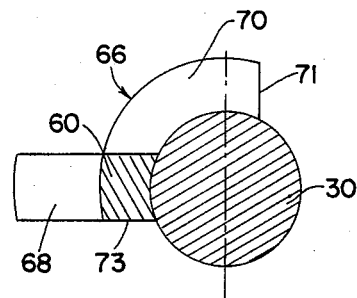
FIG. 4 is a fragmentary cross sectional view taken substantially along line 4—4 of FIG. 2.
Figure 5:
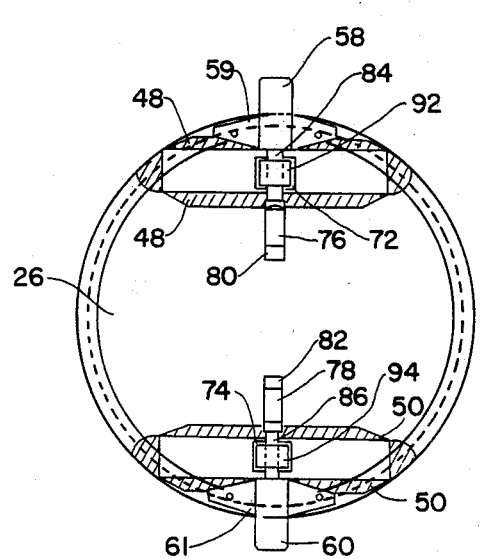
FIG. 5 is a rear elevational view of the valve disk which for clarity of presentation is broken away from the disk support brackets illustrated in cross section.

The ends of the brackets 48, 50 remote from the caps 54, 56 are welded to the rear face of the disk 26 adjacent the upper and lower portions thereof as illustrated in cross section in FIG. 5 thereby to support the disk relative to the shaft 30. The disk 26 is further supported by a respective top and bottom combination stop and guide member 58, 60 attached to and projecting from the disk at the top and bottom respectively and held in place by respective clamping brackets 59, 61. The stop and guide members 58, 60 are received within respective guide slots 64 and 66 formed in the valve body respectively at the top and bottom thereof. Each slot 64, 60 as illustrated in FIG. 4 in regard to the bottom slot 66 has a radially extending segment 68 and an arcuate or circumferentially extending segment 70 having an axis coincident with the axis of the shaft 30 for guiding the motion of the disk 26 as the disk rotates with the shaft 30 and moves laterally relative thereto as hereinafter will become clear, the segment 70 having stops 71, 73 at the terminal ends thereof.

Mounted within respective recesses 72, 74 in the rear face of the disk 26 spaced from and substantially in alignment with the guide members 58, 60, and maintained in position by respective retainers 76, 78 and retainer inserts 80, 82 bolted to the disk are a first set of roller pins 84 and 86, while a second set of pins 88 and 90 are respectively mounted within the bracket caps 54, 56. Each pin 84, 86, 88 and 90 rotatably mounts a respective roller 92, 94, 96, 98. The rollers 92 and 94 respectively abut the periphery of the cams 44, 46 while the rollers 96 and 98 abut the periphery of the respective cams 44, 46 during the portion of the cycle in which the disk 26 may move from the fully open position to the position wherein it is aligned with the seat 20 as hereinafter fully described.

Each cam 44, 46 has a substantially elliptical configuration having its major axis eccentrically located relative to the shaft 30 -o that the distance from the shaft to one distal end along the major axis is substantially greater than at the other distal end. At the end of the major axis of each cam furthest from the shaft 30, each cam 44, 46 carries a poppet or small lever member 100 pivotably carried by the cam and spring loaded by a V-shaped belleville spring 102 for biasing the poppet 100 away from the axis of the shaft 30, the poppet 100 having an arcuate or circular portion adapted to the contour of the respective roller follower 96, 98 and having an edge extending slightly beyond the normal periphery of the cam. The purpose of the poppet is to ensure that the guide brackets 48, 50, the associated caps 54, 56 and the disk 26 rotate with the shaft from the valve open position with the face of the disk 26 parallel to the axis of the bore 12, to the position where the face of the disk is substantially perpendicular to the axis of the bore and aligned with the seat 20 so that it can be moved linearly to plug the valve seat 20. In the open position and until the disk is aligned with the opening in the seat 20, the disposition of the cam is such that the poppet 100 acts against the roller 96, 98 furthest from the shaft 30 so that the cam drives the brackets, caps and disk about the axis of the shaft. Thus, it should be understood that when the guide members 58, 60 are disposed within the arcuate portion 70 of the slots 64, 66 rotation of the shaft 30 in a counter-clockwise direction as viewed in FIG. 3 permits the rollers 96 and 98 to respectively act against the periphery of the respective cam 44, 46, whereby the brackets 54, 56 and the disk 26 rotate together with the shaft, but when the guide members 58, 60 enter the linear slot 68 and abut the stop 73, further rotation of the shaft 30 results in the cams 44, 46 disengaging from the respective roller 96, 98 and as the cams continue to rotate the disk is moved linearly as guided by the linear portion 68 of the slots 64, 66.

Figure 3:
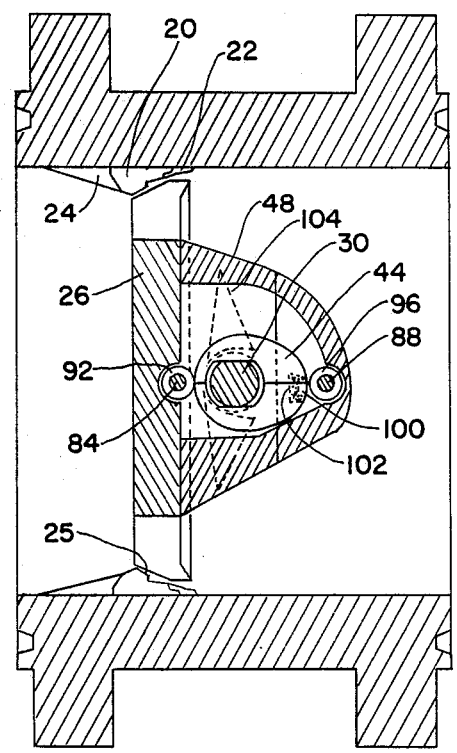
FIG. 3 is a cross sectional view taken substantially along line 3—3 of FIG. 2.

An additional and optional feature that may be included within the valve are guide vanes 104 illustrated by broken lines in FIG. 3, the vanes acting to maximize the valve flow coefficient when the valve is fully opened so that the valve may have low pressure drop at the full open position yet be tightly sealed at shut-off while having a small size and mass.

The basic operation of the valve is as follows: when the valve is fully open, the face of the disk 26 is parallel to the axis of the bore 12. When the shaft 30 rotates 90° counter-clockwise as viewed in FIG. 3, the cams 44, 46 rotate with the shaft and the spring loaded poppet 100 ensures that the disk support brackets and cap 48, 50, 54, 56, and the disk 26 rotate with the shaft 30. The guide members 58, 60 traveling within the respective circumferentially extending portion 70 of the guide slots 64, 66 as well as the friction between the shaft 30 and the brackets 48, 50 ensure that the disk rotates with the shaft during this 90° shaft rotation. When the face of the disk 26 is substantially perpendicular to the axis of the bore 12 as illustrated in FIG. 3, and the shaft 30 continues its rotation, the support brackets 48, 50 are forced to stop rotating with the shaft by reason of the guide members 58, 60 contacting the rotational stop or limit 73 in the circumferentially extending segment 70 of the guide slots. The shaft 30 continues to rotate and drive the cams which in turn rotate the rollers 92, 94 and then forcibly press the disk 26 into the seat 20 as the guide members 58, 60 are guided by the radially extending portion 68 of the slots. The seat 20 itself and its outer retainer 24 prevent further disk travel and actuator torque can maintain shut-off with fluid pressure gradients in either direction. For higher pressure gradients that press the disk into the seat, actuator torque is not required to provide leak-proof shut-off. When opening the valve from the closed position, the reverse movement of the disk, brackets, cams etc. occur until the face of the disk is parallel to the axis of the bore.

Numerous alterations of the structure herein disclosed will suggest themselves to those skilled in the art. However, it is to be understood that the present disclosure relates to the preferred embodiment of the invention which is for purposes of illustration only and not to be construed as a limitation of the invention. All such modifications which do not depart from the spirit of the invention are intended to be included within the scope of the appended claims.

Having thus set forth the nature of the invention, what is claimed herein is:

1. A hybrid butterfly valve having a body including an axially extending fluid conduit formed therethrough, a shaft journally mounted within said body and disposed transverse to the axis of said conduit, bracket means loosely disposed on said shaft for movement relative to said shaft in a direction parallel to the axis of said conduit, a valve disk disposed within said conduit, said disk being secured to said bracket means and moveable therewith, a valve seat disposed within said conduit for receiving said disk in sealed relationship therewith for shutting flow of fluid through said conduit, a pair of guide members fastened to said disk and elongated along an axis substantially parallel to said shaft, a guide slot corresponding to each guide member formed in said body for receiving a respective guide member, each guide slot including an arcuate portion spaced from said shaft and having an axis coincident with the axis of said shaft, each arcuate portion terminating at a linear portion substantially parallel to the axis of said conduit extending radially from said shaft toward said valve seat, cam means fastened to said shaft, said cam means having a substantially elliptical configuration having a major axis eccentrically disposed relative to the axis of said shaft so as to have a first distal end on said major axis further from said shaft than a second distal end on said major axis, first and second cam follower means, at least one of said follower means being carried by said bracket means, said cam follower means being disposed for contacting respective first and second distal ends of said cam means when said guide members are disposed in said arcuate portion, and means for turning said shaft to turn said cam means for rotating said bracket means and thus said disk while said guide members are in said arcuate portion and and for therefore forcing said bracket means and said disk linearly with said guide members in said linear portion until said disk is in sealed relationship with said seat.

2. A hybrid butterfly valve as recited in claim 1, wherein said said bracket means includes a shaft receiving slot having linear edges, the edges of said slot being elongated in a direction parallel to the axis of said conduit when said guide members are disposed in said radially extending portion of said guide slot, and said edges being elongated in a direction substantially normal to said axis of said conduit when said conduit is fully open.

3. A hybrid butterfly valve as recited in claim 1, wherein said first cam follower means is rotatably carried by said disk and said second cam follower means is rotatably carried by said bracket means.

4. A hybrid butterfly valve as recited in claim 3 including means for urging said cam means adjacent said first distal end against said second follower means while said guide members are disposed in said arcuate portion of said guide slot.

5. A hybrid butterfly valve as recited in claim 4, wherein said bracket means includes a shaft receiving slot having linear edges, the edges of said slot being elongated in a direction parallel to the axis of said conduit when said guide members are disposed in said radially extending portion of said guide slot, and said edges being elongated in a direction substantially normal to said axis of said conduit when said conduit is fully open.

6. A hybrid butterfly valve as recited in claim 1, wherein said bracket means comprises at least two brackets secured to said disk at spaced apart locations, and said cam means comprises at least two cams secured to said shaft at spaced apart locations.

7. A hybrid butterfly valve as recited in claim 6, wherein said bracket comprises a bifurcated member having spaced apart surfaces, and each cam is disposed intermediate the spaced apart surfaces of a respective bracket.

8. A hybrid butterfly valve as recited in claim 7, wherein said said bracket means includes a shaft receiving slot having linear edges, the edges of said slot being elongated in a direction parallel to the axis of said conduit when said guide members are disposed in said radially extending portion of said guide slot, and said edges being elongated in a direction substantially normal to said axis of said conduit when said conduit is fully open, said shaft receiving slot being disposed in each surface of said bracket.

9. A hybrid butterfly valve as recited in claim 6, wherein said first cam follower means comprises a follower corresponding to each cam and said second cam follower means comprises a follower corresponding to each cam.

10. A hybrid butterfly valve as recited in claim 9, wherein said bracket comprises a bifurcated member having spaced apart surfaces, and each cam is disposed intermediate the spaced apart surfaces of a respective bracket.

11. A hybrid butterfly valve as recited in claim 10, wherein said bracket means includes a shaft receiving slot having linear edges, the edges of said slot being elongated in a direction parallel to the axis of said conduit when said guide members are disposed in said radially extending portion of said guide slot, and said edges being elongated in a direction substantially normal to said axis of said conduit when said conduit is fully open, said shaft receiving slot being disposed in each surface of said bracket.

12. A hybrid butterfly valve as recited in claim 11, wherein each second follower is disposed intermediate the spaced apart surfaces of a respective bracket.

* * * * *